United States Patent [19]
Pert

[11] Patent Number: 4,589,640
[45] Date of Patent: May 20, 1986

[54] CONNECTOR

[76] Inventor: James Pert, 56 Home Street TFl, Edinburgh, Scotland, EH3 9NA

[21] Appl. No.: 780,245

[22] Filed: Sep. 26, 1985

Related U.S. Application Data

[63] Continuation of Ser. No. 408,167, Aug. 16, 1982, abandoned.

[51] Int. Cl.⁴ ................................................. B25B 3/00
[52] U.S. Cl. ........................................ 269/2; 269/196; 269/203; 269/236; 269/251
[58] Field of Search .................... 269/2, 196, 203–206, 269/236, 251, 307

[56] References Cited

U.S. PATENT DOCUMENTS

| | | | |
|---|---|---|---|
| 1,321,627 | 11/1919 | Hagstrom | 269/203 |
| 4,183,513 | 1/1980 | Enz | 269/203 |
| 4,236,702 | 12/1980 | Keddie | 269/307 |

FOREIGN PATENT DOCUMENTS

| | | |
|---|---|---|
| 291685 | 7/1971 | Austria . |
| 382701 | 3/1922 | Fed. Rep. of Germany . |
| 936198 | 11/1946 | France . |
| 2284063 | 4/1975 | France . |
| 865588 | 4/1961 | United Kingdom . |
| 1185169 | 3/1970 | United Kingdom . |

Primary Examiner—Frederick R. Schmidt
Assistant Examiner—Judy J. Hartman
Attorney, Agent, or Firm—Saidman, Sterne, Kessler & Goldstein

[57] ABSTRACT

A connector comprises two parts; namely, a keeper 10 in the form of a substantially flat plate having a slot 12 therein, and a bar 11 which locates in the slot. The keeper has a locking pin 13 which screws into a hole 14 in the keeper and engages the bar. The bar and slot are curved transversely so that pressure by the pin causes a greatly increased frictional grip between the slot and bar than would otherwise be the case if the bar and slot were flat.

The connector has numerous uses such as a straight edged clamp as described in the preferred embodiment or for assembly of a kit of parts where a bar and keeper are incorporated into the respective parts to be joined.

13 Claims, 2 Drawing Figures

CONNECTOR

This application is a continuation of application Ser. No. 408,167, filed Aug. 16, 1982 now abandoned.

FIELD OF THE INVENTION

This invention relates to a connector, and more particularly relates to a device for joining two parts or for use as a straight edged clamp.

SUMMARY OF THE INVENTION

According to the invention, there is provided a connector comprising a keeper having a longitudinally formed slot therein, a bar which is removably engageable in the slot, and a locking pin located in a transverse aperture in the keeper to engage a major or top face of the bar in the locking position of the pin, said slot and said bar having a similar transverse deformation.

Preferably, said transverse deformation is a shallow radiussed curve.

Preferably also, the locking pin engages the concave face of the bar.

The shallow curvature of the bar and slot enables the locking pin to securely lock or unlock the bar due to a slight deformation of the bar caused by pressure from the pin, thus greatly increasing the frictional grip between the slot and bar.

Also, the pin requires only a small amount of rotation, e.g. 5°–7°, so the connector is quick acting, both to secure and release.

BRIEF DESCRIPTION OF THE DRAWING

An embodiment of the present invention will now be described, by way of example with reference to the accompanying drawings, in which.

DESCRIPTION OF THE PREFERRED EMBODIMENT

Figure 1:
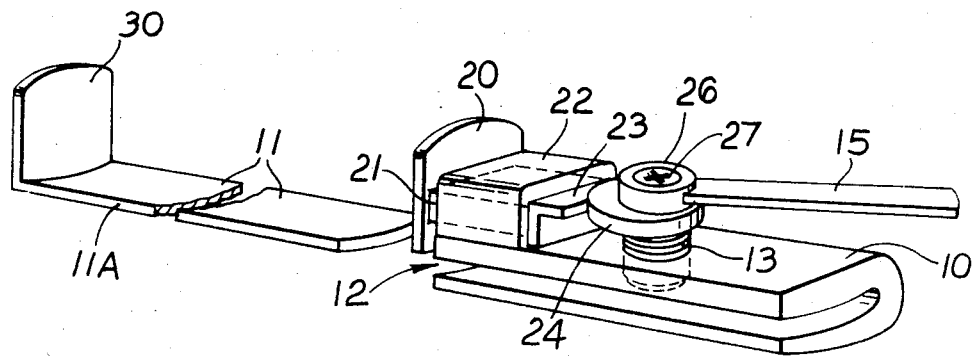
FIG. 1 illustrates one form of the connector according to the invention seen from below.
Figure 2:
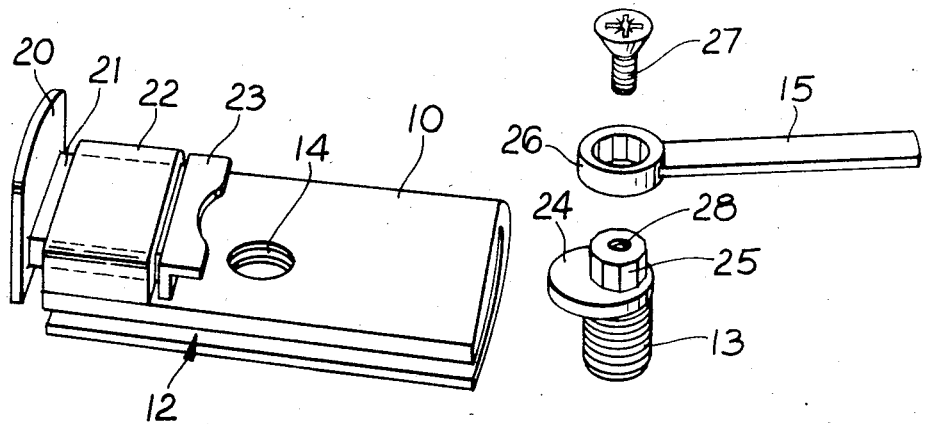
FIG. 2 illustrates the parts of the keeper.

In the embodiment, the connector is part of a straight-edged clamp for location on a workpiece such as a piece of wood or sheet of metal (not shown) prior to scribing or cutting a straight edge along the workpiece.

The connector comprises a keeper 10 and a bar 11 which in this embodiment forms the straight edge and may be a rule guide marked out in metric and imperial units. The keeper 10 has a longitudinal slot 12 which, in this embodiment, is open along one side so that the bar can enter the slot either longitudinally or transversely. Slot 12 includes a slot having upper and lower surfaces. An aperture 14 communicates with the upper surface of slot 12. A side member connects the upper and lower surfaces of the slot. The bar 11 has top and bottom faces. The top face of bar 11 is adjacent to the upper surface of slot 12 when bar 11 is engaged in slot 12. The lower face of bar 11 is similarly adjacent the lower surface of slot 12 when bar 11 is engaged in slot 12. The upper and lower surfaces of the slot and the top and bottom faces of the bar have similar transverse deformations in the form of a radiussed curve. The bar 11 has a greater width than the slot 12 and so will have an unobstructed straight edge 11A. The slot 12 and bar 11 have a similar transverse deformation, namely a shallow radiussed curve which is concave on its underside.

The keeper carries a locking pin 13 located in an aperture 14 bored transversely to slot 12 on the underside of the keeper body. The inner end of the pin engages the concave major or top face of the bar and presses the lower face against the lower surface of the slot; due to the deformation of both bar and slot, the pressure on the bar by creating a downward force upon the top face of the bar causes a relatively large increase in the frictional grip between the bar and keeper, thus securely locking the bar in the keeper against movement in both the longitudinal and transverse directions.

The locking pin 13 is an Allan stud which carries a shaft 15 by which a user can rotate the pin. Only a small amount of rotation is required to lock and unlock the bar, namely 5°–7°. The keeper mounts a flange 20 which in this embodiment is carried on a plate 21 slidably located in a casing 22. The plate 21 terminates in an abutment 23 located adjacent to the aperture 14 of the keeper, and a shoulder 24 is provided on the stud to bear against the abutment 23. The shoulder 24 is eccentrically mounted on the Allan stud.

The outer (or lower) end of the stud has a head 25 which is ribbed externally and the shaft 15 has a ring portion 26 internally ribbed to overlie the head in any one of several positions to best suit the user. The ring portion 26 is secured on the pin 13 by a countersunk screw 27 which engages in a threaded hole 28 in the pin 13.

The outer end of the Allan pin 13, i.e. the shaft ring 25/26 does not extend beyond the height of the keeper flange 20 which may be 1.5 cm so the workpiece may not require to be supported off the working surface depending on the thickness of the workpiece.

The end of the bar 11 also has a flange 30, which co-operates with the flange 20 on the keeper to clamp the workpiece therebetween; the flanges 20, 30 thus form clamping jaws.

In use, the bar is laid across the workpiece with its flange 30 hooked downwards over the end of the workpiece. The keeper is slidably adjusted along the bar until its downwardly extending flange 30 abuts the opposite end of the workpiece. The Allan stud is then tightened to lock the keeper to the bar. The eccentric shoulder 24 is then turned by pressure of the palm on the shaft 15 so as to push the keeper flange 20 more firmly against the workpiece. The workpiece can then be scribed or cut, e.g. using a hand held circular saw along the unobstructed edge 11A of the bar.

The connector above described may vary in size according to requirements; the keeper may be 8 cm long with a 1 meter rule guide, for use by a tradesman or D.I.Y. person up to a large size for use on the shop floor in scribing and cutting large sheets or panels of material.

The connector has many other applications: it can be used where kits of parts are assembled into, e.g. greenhouses, garages and the like, the keeper and bar being incorporated into the respective parts to be joined. The locking pins may, instead of a permanent shaft 15 as in the described embodiment, have a recess for a locking key.

The connector can be utilised as a quick release mechanism; in this case, the locking pin has its permanent shaft which, in the locked position, can be tripped when desired to loosen the pin and release the bar.

I claim:

1. A connector comprising a keeper having an open-sided slot formed longitudinally therein for the insertion of a bar, said slot including an upper surface, a lower surface and a single side connecting said upper and lower surfaces, a bar which can be inserted into and removed from said slot, through the open side thereof, said bar having a top face which is adjacent said upper surface of said slot when said bar is engaged in said slot, a single threaded aperture formed in one of said upper and lower surfaces of said keeper transversely to said slot, and a single threaded locking pin located in said aperture in said keeper to engage said bar in a locking position of the pin, said slot and said bar having a similar transverse deformation in the form of a radiussed curve.

2. A connector as claimed in claim 1 in which the keeper is a rectangular substantially flat member.

3. A connector as claimed in claim 1 wherein said bar includes a concave face, and in which the locking pin engages the concave face of the bar.

4. A connector as claimed in claim 1 wherein said connector comprises a straight-edged clamp, comprising a slide plate mounted on the keeper, a first clamping jaw mounted on said slide plate a second clamping jaw mounted on an end of the bar, and an abutment on said slide plate to engage pressure means associated with the locking pin to urge the first clamping jaw towards the second clamping jaw.

5. A connector as claimed in claim 4 in which the pressure means is a shoulder eccentrically mounted on the locking pin.

6. Apparatus, which comprises:
a keeper having an elongated open-sided slot extending longitudinally therein, said slot being formed by a upper surface and a lower surface and a single side member connecting said upper and lower surfaces, said upper and lower surfaces having a similar transverse deformation in the form of a radiussed curve, said keeper further including a single threaded aperture opening onto one of said upper and lower surfaces of said slot;
a bar removably engageable in said slot, said bar being wider than said slot, said bar having top and bottom faces which lie adjacent said upper and lower surfaces of said slot, respectively, when said bar is engaged in said slot, said faces of said bar and said upper and lower surfaces of said slot having similar transverse deformations in the form of a radiussed curve; and
a single threaded locking pin located in said aperture in said keeper to engage said bar in a locking position of said pin urging said bar into engagement with said keeper, for securely locking said bar in said keeper against movement in both the longitudinally and transverse directions.

7. Apparatus as set forth in claim 6, wherein said apparatus comprises a straight-edged clamp, comprising a slide plate mounted on the keeper, a first clamping jaw mounted on said slide plate a second clamping jaw mounted on an end of the bar, and an abutment on said slide plate to engage pressure means associated with the locking pin to urge the first clamping jaw towards the second clamping jaw.

8. Apparatus as set forth in claim 7, in which the pressure means is a shoulder eccentrically mounted on the locking pin.

9. Apparatus as set forth in claim 8, further comprising a handle attached to said locking pin wherein rotation of said handle 5°–7° causes said pin to fully engage said bar.

10. Apparatus as set forth in claim 9, wherein said handle is adapted to be operated by force applied by the users palm.

11. Apparatus as set forth in claim 6, wherein the edge of said bar extending beyond said slot is a straight edge.

12. Apparatus as set forth in claim 11, wherein a rule guide is marked out on said bar.

13. The connector of claim 1, wherein the transverse deformation of said slot comprises a transverse deformation of the one of said upper and lower surfaces of said keeper which does not include said single threaded aperture.

* * * * *